United States Patent
Gostomski

[15] 3,674,104
[45] July 4, 1972

[54] CUSHIONED SUPPORT MEANS

[72] Inventor: Frank T. Gostomski, 1053 N. Beech St., Wahoo, Nebr. 68066

[22] Filed: Dec. 29, 1969

[21] Appl. No.: 888,420

[52] U.S. Cl. .............................................. 180/5 R, 280/25
[51] Int. Cl. ....................................................... B62m 27/02
[58] Field of Search .................... 180/5, 6, 4, 3; 280/21 R, 25

[56] References Cited

UNITED STATES PATENTS

| | | | |
|---|---|---|---|
| 3,023,824 | 3/1962 | Bombardier | 180/5 R X |
| 3,480,096 | 11/1969 | Hammitt | 180/5 R |
| 3,425,707 | 2/1969 | Horiuchi | 280/55 |

*Primary Examiner*—Richard J. Johnson
*Attorney*—Henderson & Strom

[57] ABSTRACT

A cushioned support means for use with snowmobiles is provided which comprises two laterally aligned sleeves formed through the bottom of the snowmobile which have support shafts extending therethrough. A shock absorber is affixed to the upper end of each of the support shafts and a means for attaching skis is affixed to the lower end of each of the support shafts. Coil springs encircle each of the support shafts and urge the shafts downwardly. The support shafts are preferably rotatable about their longitudinal axes and movable upwardly and downwardly along these axes and are utilized as a portion of the steering apparatus for the snowmobile.

9 Claims, 4 Drawing Figures

PATENTED JUL 4 1972  3,674,104
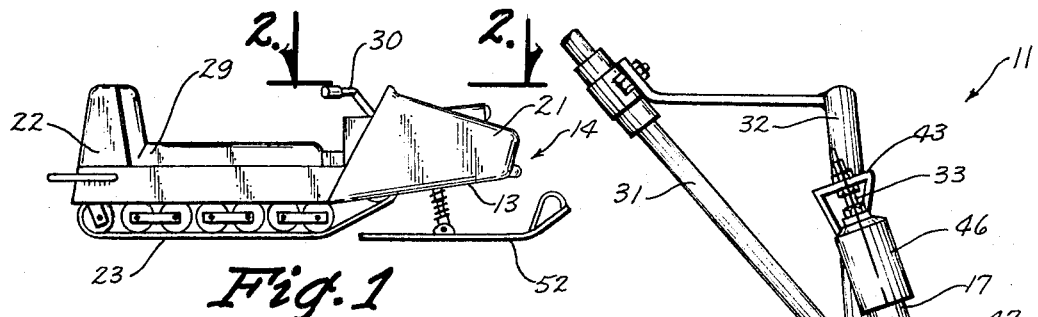
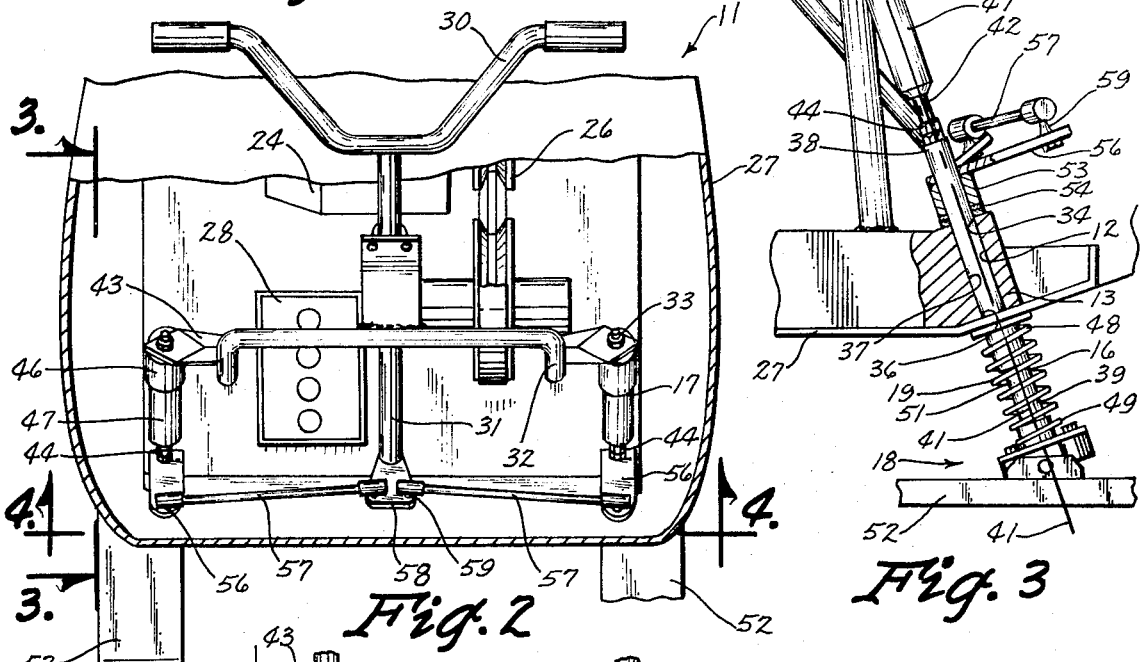
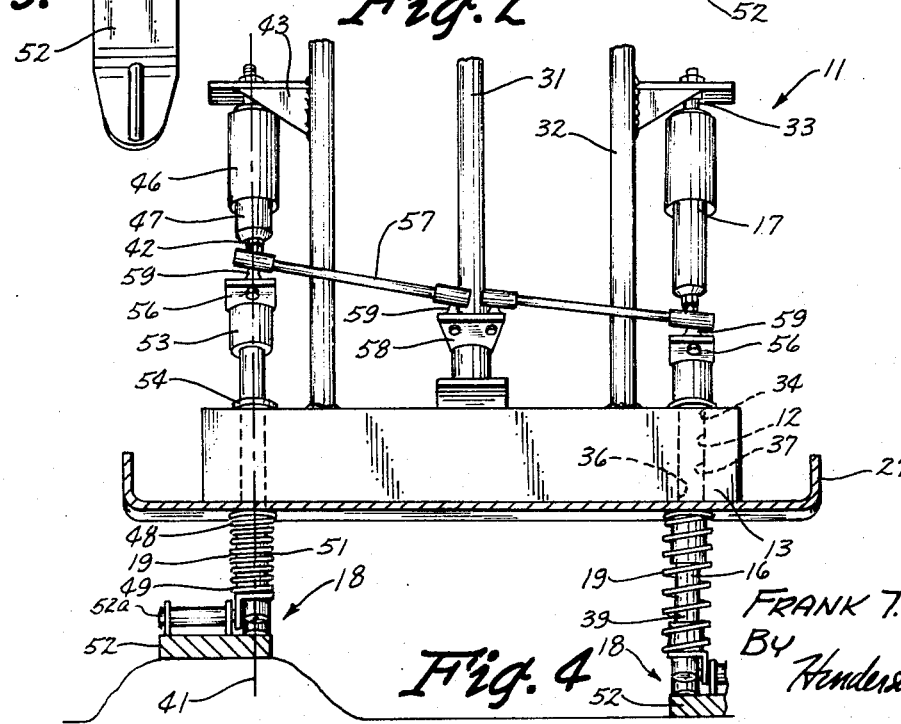
INVENTOR
FRANK T. GOSTOMSKI
BY Henderson & Strom
ATTORNEYS

CUSHIONED SUPPORT MEANS

BACKGROUND OF THE INVENTION

This invention relates to a cushioned support means for snowmobiles, and more specifically, to a novel support means utilizing support shafts and shock absorbers in combination.

As snowmobile use gains in popularity, creature comforts and safety become more and more important. While some of the snowmobiles now being utilized have springs operatively connected to the support means, none of these snowmobiles have a means for dampening the sometimes violent spring action. Concomitantly, these snowmobiles are difficult to steer in rough terrain and the passengers riding thereon are subjected to discomforts.

The cushioned support means of this invention dampens the violent spring action and renders the snowmobile easier to steer. Riding comfort on snowmobiles using this cushioned support means is also materially enhanced.

SUMMARY OF THE INVENTION

This invention relates to a cushioned support means for a snowmobile having a front end and a rear end and a drivable, endless track for motive power and means for driving the track. The cushioned support means comprises two laterally aligned sleeves formed through the bottom of the snowmobile with support shafts extending through the sleeves. Frame means are disposed above the support shafts. Shock absorbers are affixed at their lower ends to the support shafts and at their upper ends to the frame means. Coil springs encircle each of the support shafts and normally urge the shafts downwardly. Means are affixed to the lower ends of the support shafts for attaching skis thereto.

An advantage of this cushioned support means over prior art devices is that the spring action is dampened, especially in rough terrain.

Another advantage is that the snowmobile is more easily steered and passengers riding thereon are not subjected to violent, bouncing action.

Additionally, this cushioned support means utilizes a shock absorber with each of the support shafts, thereby allowing the support means to be incorporated into the steering system for the snowmobile.

BRIEF DESCRIPTION OF THE DRAWINGS

FIG. 1 is a side view of a snowmobile utilizing the cushioned support means of this invention.

FIG. 2 is an enlarged top view of the cushioned support means taken along line 2—2 of FIG. 1 with the snowmobile shell partially cut away.

FIG. 3 is a side view of the cushioned support means taken along line 3—3 of FIG. 2 with the snowmobile shell partially cut away.

FIG. 4 is a front view of the cushioned support means taken along line 4—4 of FIG. 2 with the snowmobile shell partially cut away.

DESCRIPTION OF THE PREFERRED EMBODIMENTS

Referring now to the drawings, the cushioned support means of this invention is indicated generally at 11 in FIGS. 2–4. The cushioned support means 11 comprises two sleeves 12 formed through the bottom 13 of the snowmobile 14 in lateral alignment. Support shafts 16 (FIGS. 3–4) extend through the sleeves 12 and are affixed to shock absorbers 17 at the upper ends and means 18 for attaching skis at the lower ends. Coil springs 19 encircle each of the support shafts 16 and urge the support shafts 16 downwardly.

More specifically, the cushioned support means 11 of this invention is utilized with a conventional snowmobile 14 (FIG. 1) and generally forms a portion of the steering apparatus. The snowmobile 14 has a front end 21 and a rear end 22 and utilizes a drivable endless track 23 for motive power. A motor 24 (FIG. 2) with a drive pulley 26 attached thereto is mounted within a light gauge metal shell 27 and is used to drive the track 23. A battery 28 is disposed in the interior of the snowmobile 14 and utilized to start the motor 24. A passenger seat 29 is normally provided at the rear end 22 of the snowmobile 14.

The snowmobile 14 is guided with a rotatable steering bar 30 (FIGS. 1–4) having a downwardly extending steering shaft 31 which is generally and preferably operatively secured to the cushioned support means 11 of this invention. The steering bar 31 is rotatably secured to an inverted U-shaped frame 32 disposed in the interior of the snowmobile 14. This frame 32 is disposed above the support shafts 16. The upper ends 33 of the shock absorbers 17 are attached thereto.

The cushioned support means 11 comprises two sleeves 12 (FIGS. 3–4) formed downwardly through the bottom 13 of the snowmobile 14; the sleeves 12 being laterally aligned and disposed on opposing sides of the snowmobile 14. Preferably, the sleeves 12 are formed near the front end 21 of the snowmobile 14 and slant forwardly and outwardly from the top 34 to the bottom 36. The openings 37 in the sleeves 14 are of cylindrical configuration and slidingly mate with the support shafts 16.

Two support shafts 16 (FIGS. 3–4) are disposed, respectively, in the two sleeves 12. The support shafts 16 have upper ends 38 and lower ends 39 which extend outwardly of the top 34 and bottom 36, respectively, of the sleeves 12. The support shafts 16 are laterally aligned and disposed on opposing sides of the snowmobile 14 through the sleeves 12. The support shafts 16 generally slant forwardly and outwardly from the upper ends 38 to the lower ends 39. The outward slant (not shown) provides better steering and better cornering for the snowmobile 14.

The support shafts 16 (FIGS. 3–4) are generally of elongate, cylindrical configuration and have a longitudinal axis 41. When used as a portion of the steering apparatus, each of the support shafts 16 is rotatable about its longitudinal axis 41 and movable upwardly and downwardly along its longitudinal axis 41 to provide a cushioned ride.

A hydraulic shock absorber 17 having an upper end 33 and a lower end 42 is affixed at its lower end 42 to the upper ends 38 of each of the support shafts 16. Preferably, rubber mountings (not shown) are utilized to secure the support shafts 16 to the shock absorbers 17. Then, as the sleeves 12 wear, no undue stress is put on this union. The upper ends 33 of the shock absorbers 17, as beforementioned, are bolted to lugs 43 which are welded to the U-shaped frame 32.

The "direct action" or "telescoping" two-way type of shock absorber 17 shown in FIGS. 2–4 is preferred for use herein. These shock absorbers 17 automatically adapt to the severity of the shock. A soft, cushioned ride is obtained over small bumps and firm steering control is achieved over the action of the coil springs 19 in response to large bumps. The shock absorbers 17 operate in both directions as the spring rebound can be almost as violent as the original action.

By employing these shock absorbers 17 in substantially longitudinal alignment with the support shafts 16 and inside the shell 27 of the snowmobile 14, the shock absorbers 17 are not clogged with ice and snow. They function properly at all times and the joint 44 (FIGS. 2–3) between the shock absorber 17 and the support shaft 16 is not subjected to undue stress.

Each of the shock absorbers 17 are formed from an upper portion 46 and a lower portion 47. These portions 46 and 47 are rotatable in each other and thereby allow the support shafts 16 to rotate about their longitudinal axes 41.

Coil springs 19 having upper ends 48 and lower ends 49 encircle a portion of each of the support shafts 16, preferably the lower portion 51, and urge the support shafts 16 downwardly. The upper end 48 of each spring 19 abuts the bottom 13 of the snowmobile 14 while the lower end 49 abuts the means 18 for attaching skis 52. The springs 19 absorb the initial shock as shown in FIG. 4 and the shock absorbers 17 then dampen the spring action. By utilizing coil springs 19 encircling the support shafts 16, both wheels (not shown) and skis 52 can be utilized with the snowmobile 14 as explained in detail in my copending application entitled Support Means for Snowmobiles, filed Oct. 21, 1969, Ser. No. 868,015.

Means 18 are affixed to the lower ends 39 of the support shafts 16 for attaching skis 52 or wheels (not shown) thereto. Although any means 18 can be utilized herein, it is preferred that the bracket means 18 shown in FIGS. 3 and 4 be used herein. This structure is explained in detail on pages 5 to 8 of my copending application referred to above which is hereby incorporated by reference. By slanting the support shafts 16 outwardly, a shorter axle 52a can be utilized as the axle 52a and support shafts 16 both fall within the wheel rim (not shown).

A steering bracket 53 is rigidly affixed to each of the support shafts 16 above the top 34 of the sleeves 12. Preferably, the steering brackets 53 are splined to the support shafts 16 and are of a larger diameter than the circular opening 37 in the sleeve 12 thereby limiting the downward movement of each of the support shafts 16. A resilient bushing 54 is disposed between the steering brackets 53 and the tops 34 of the sleeves 12 to help absorb shock when traveling over rough terrain.

Each of the steering brackets 53 (FIGS. 2–4) has a forwardly extending leg 56. This leg 56 preferably extends outwardly about 10° to 15° from a straight ahead position. The snowmobile 14 can thereby be turned more sharply as the inside ski 52 turns more sharply than the outside ski 52. A tie rod 57 connects the leg 56 with a similar leg 58 secured to the steering shaft 31. The tie rods 57 are connected to the legs 56 and 58 by ball joints 59 thereby allowing the support shafts 16 to move upwardly and downwardly while maintaining steering control. As can be seen from FIG. 4, the compression of springs 19 provide only minimal inward or outward movement of the skis 52 as the tie rods 57 rotate around ends 59.

Although a preferred embodiment has been described hereinbefore it is to be remembered that various modifications may be made without departing from the invention as defined in the appended claims.

I claim:

1. In a snowmobile having a front end and a rear end and having a drivable, endless track for motive power and means for driving the track, a cushioned support means comprising:

two sleeves formed downwardly through the bottom of the snowmobile proximate one end thereof, said sleeves being laterally aligned;

two support shafts, each of said shafts having an upper end and a lower end and extending through one of said sleeves;

frame means for the snowmobile disposed in the interior of the snowmobile above said support shafts;

two hydraulic shock absorbers, each of said shock absorbers having an upper end and a lower end and being affixed at said upper end to said frame means and affixed at said lower end to said upper end of one of said support shafts;

two coil springs, each of said springs having two ends and encircling a portion of one of said support shafts; said springs urging said support shafts downwardly; and means affixed to said lower ends of said support shafts for attaching skis thereto.

2. The support means of claim 1 wherein each of said support shafts has a longitudinal axis and wherein each of said support shafts is rotatable about said longitudinal axis and movable upwardly and downwardly along said longitudinal axis.

3. The support means of claim 2 wherein a steering bracket is rigidly affixed to each of said support shafts above said sleeves thereby limiting the downward movement of each of said support shafts.

4. The support means of claim 3 wherein the snowmobile has a single steering shaft and wherein said steering brackets are connected to the steering shaft by tie rods.

5. The support means of claim 4 wherein each of said springs encircle the lower portion of one of said support shafts and wherein one end of said spring abuts the bottom of the snowmobile and the other of said ends abuts the means for attaching skis.

6. The support means of claim 4 wherein said sleeves have a circular opening formed therethrough and wherein said support shafts are of cylindrical configuration and wherein said sleeves and said support shafts slant forwardly and outwardly from the upper ends to the lower ends.

7. The support means of claim 4 wherein said shock absorbers are comprised of an upper portion and a lower portion, said lower portion being rotatable in said upper portion.

8. The support means of claim 4 wherein said steering brackets are splined to said support shafts and wherein said tie rods are connected to said steering brackets and said steering shaft by ball joints.

9. The support means of claim 4 wherein each of said steering brackets comprises:

a sleeve splined to said support shaft;

a leg extending forwardly and outwardly of said sleeve; and means for attaching said tie rods to said leg.

* * * * *